(12) United States Patent
Haba et al.

(10) Patent No.: US 9,328,550 B1
(45) Date of Patent: May 3, 2016

(54) INSULATED COMMERCIAL SECTIONAL DOOR WITH EXTRUDED SPACERS

(71) Applicant: Overhead Door Corporation, Lewisville, TX (US)

(72) Inventors: Charles A. Haba, Massillon, OH (US); Dwayne J. Kornish, Mt. Hope, OH (US); Jim Mast, Mt. Hope, OH (US); Randy Lukesh, Mt. Hope, OH (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

(21) Appl. No.: 13/966,131

(22) Filed: Aug. 13, 2013

(51) Int. Cl.
E06B 3/70 (2006.01)

(52) U.S. Cl.
CPC ............ *E06B 3/7015* (2013.01); *E06B 3/7001* (2013.01); *E06B 2003/7023* (2013.01)

(58) Field of Classification Search
CPC ................. E06B 3/485; E06B 3/7001; E06B 2003/7023; E06B 3/7015
See application file for complete search history.

(56) References Cited

U.S. PATENT DOCUMENTS

| | | | | |
|---|---|---|---|---|
| 3,546,038 | A | * | 12/1970 | Randall et al. .................. 156/83 |
| 3,941,180 | A | * | 3/1976 | Thill .......................... 160/229.1 |
| 3,967,671 | A | * | 7/1976 | Stanley et al. ................ 160/232 |
| 3,994,105 | A | * | 11/1976 | Jamison et al. ............ 52/127.12 |
| 4,183,393 | A | * | 1/1980 | Bailey ........................... 160/232 |
| 4,746,383 | A | | 5/1988 | Bacon et al. |
| 4,748,780 | A | * | 6/1988 | Vinther ........................ 52/309.3 |
| 5,129,441 | A | * | 7/1992 | Leist et al. ................. 160/229.1 |
| 5,133,108 | A | * | 7/1992 | Esnault ........................... 16/225 |
| 5,148,850 | A | * | 9/1992 | Urbanick ................... 160/231.1 |
| 5,622,012 | A | * | 4/1997 | Schijf ................................ 52/71 |
| 5,737,802 | A | * | 4/1998 | Jella ............................... 16/93 R |
| 5,832,665 | A | * | 11/1998 | Miller et al. ....................... 49/27 |
| 6,253,825 | B1 | * | 7/2001 | Pettersson et al. ............ 160/201 |
| 6,484,447 | B1 | * | 11/2002 | Snyder et al. ................ 49/499.1 |
| 6,619,005 | B1 | * | 9/2003 | Chen ............................... 52/455 |
| 8,281,844 | B1 | * | 10/2012 | Zacchia ........................ 160/201 |
| 2004/0079494 | A1 | * | 4/2004 | Snyder .......................... 160/201 |
| 2007/0204546 | A1 | * | 9/2007 | Lynch et al. .................... 52/456 |
| 2012/0272592 | A1 | * | 11/2012 | Bellavia ....................... 52/173.3 |

OTHER PUBLICATIONS

Thermacore Door Systems, Brochure, Overhead Door Corporatiion, Feb. 2012, 15 pgs.
Replacement Garage Door Bottom Theshold Seals, Website Printout, Sports Imports Ltd, Jun. 19, 2013, 2 pgs.

* cited by examiner

*Primary Examiner* — Elizabeth A Quast
(74) *Attorney, Agent, or Firm* — Gardere Wynne Sewell LLP

(57) ABSTRACT

An improved insulated door panel having an outer and inner spaced apart skins and an internal foam core includes a first spacer disposed between a top end of the outer skin and a top end of the inner skin and a second spacer disposed between a bottom end of the outer skin and a bottom end of the inner skin. The first and second spacers include first and second protrusions, respectively, on an inner face of the first and second spacers. The first and second protrusions secure the first and second spacers to the foam core.

18 Claims, 5 Drawing Sheets

FIG. 2
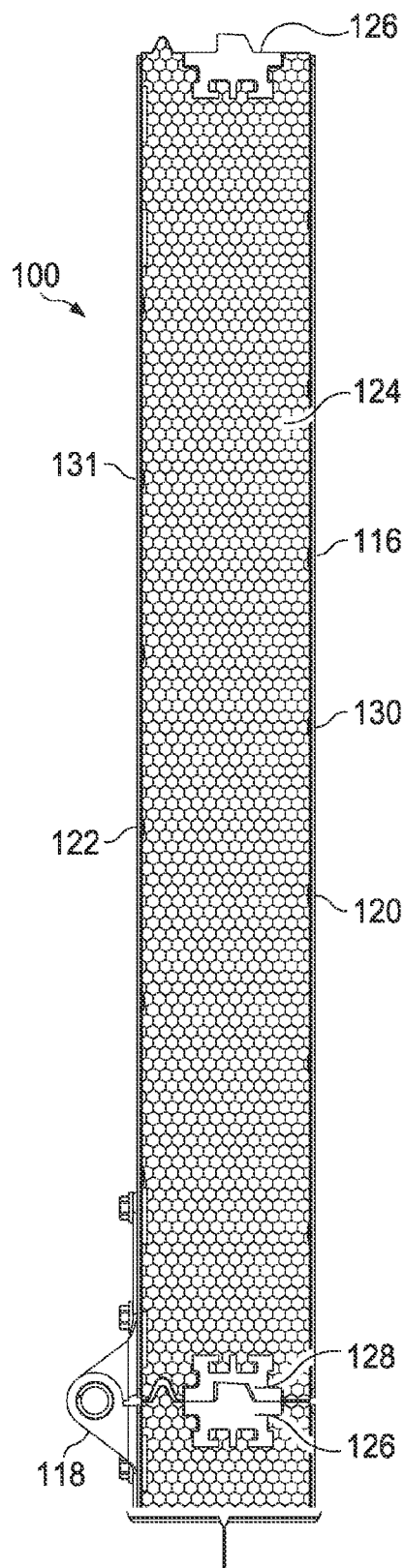
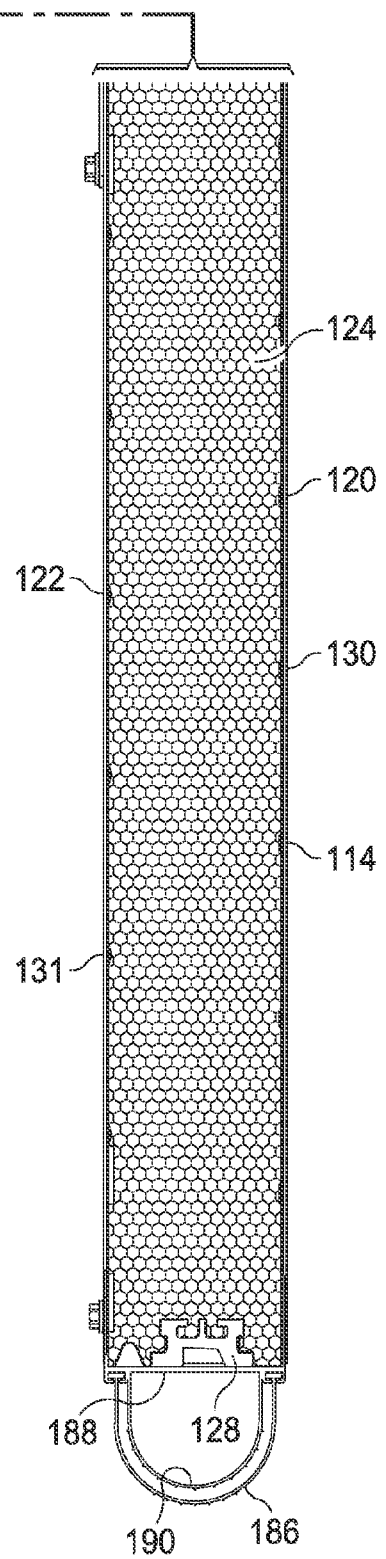

INSULATED COMMERCIAL SECTIONAL DOOR WITH EXTRUDED SPACERS

BACKGROUND

Doors of the type used for closing a large opening in a building, such as a garage door, have long been manufactured using a plurality of substantially identical panels. The plurality of panels are typically hingedly or pivotally connected together to permit relative hinging movement between adjacent panels when the door is moved between a closed vertical position in which the panels are aligned, an intermediate position in which the panels are hinged at an angle to each other, and an open horizontal position.

Such multi-panel doors are commonly referred to as sectional doors and often employ thin sheet material, such as metal, fiberglass, or plastic, and an insulating core to form each panel of the multi-panel door. Thus, the individual panels are light in weight and highly warp-resistant over relatively long spans of time. However, due to the composite construction of such panels, multi-panel doors often lack sufficient structural strength and/or do not provide sufficient thermal and electrical insulation between adjacent panels, and between the door and the outside environment.

SUMMARY

In a first aspect, there is provided an improved insulated door panel having first and second spaced apart skins, an internal foam core and first and second spacers. The first spacer is disposed between a top end of the outer skin and a top end of the inner skin and the second spacer is disposed between a bottom end of the outer skin and a bottom end of the inner skin. The first spacer includes a first protrusion on an inner surface of the first spacer and the second spacer includes a second protrusion on an inner surface of the second spacer. The first protrusion secures the first spacer to the foam core and the second protrusion secures the second spacer to the foam core.

In certain embodiments, the first and second protrusions include a ledge to further secure the first and second protrusions to the foam core.

In other embodiments, the first and second protrusions are texturized to increase the surface area of the first and second protrusions that contacts the foam core.

In yet another embodiment, the first and second spacers each include three protrusions.

In still another embodiment, an outer surface of the first spacer includes a tongue and an outer surface of the second spacer includes a groove that corresponds to the tongue.

In some embodiments, the first spacer and the second spacer include lateral recesses to provide a friction fit with bent portions of the outer and inner skins.

In an additional embodiment, the first and second spacers are sized to maintain a distance between the outer skin and the inner skin. In another embodiment, the first and second spacers are sized to maintain a distance of up to about three inches between an exterior surface of the outer skin and an exterior surface of the inner skin.

In a second aspect, there is described a continuous, automated method of manufacturing insulated door panels that includes placing a first spacer adjacent to a top end of an inner skin and placing a second spacer adjacent to a bottom end of the inner skin. The first spacer includes a first inner protrusion and the second spacer includes a second inner protrusion. The method includes injecting a foamable liquid between the inner skin, the first spacer and the second spacer and placing an outer skin so that a top end of the outer skin is adjacent to the first spacer and a bottom end of the outer skin is adjacent to the second spacer. The method also includes allowing the foam to cure so that the first protrusion and the second protrusion are held within the cured foam to hold the first spacer and the second spacer in position with respect to the outer and inner skins.

In certain embodiments, allowing the foam to cure so that the first protrusion and the second protrusion are held within the cured foam includes securing a ledge of the first and second protrusions within the cured foam.

In other embodiments, the method also includes conveying the outer skin, the inner skin, the first spacer and the second spacer to a foaming station where the foamable liquid is injected.

In yet another embodiment, the method includes unrolling the first spacer from a first roller.

In still another embodiment, the method includes unrolling the second spacer from a second roller.

In some embodiments, the method includes aligning the first spacer and the second spacer so that they are perpendicular to the inner skin.

In another embodiment, the method includes locating the first spacer and the second spacer between the outer skin and the inner skin to maintain a predetermined distance between an exterior surface of the outer skin and an exterior surface of the inner skin.

In certain embodiments, the predetermined distance is between about 1 and about 4 inches.

In some embodiments, the method includes passing the first spacer, the second spacer, the inner skin, and the outer skin through an adjustable pressure conveyor.

In other embodiments, the adjustable pressure conveyor can accept different sizes of the first spacer and second spacer to create a panel of different thicknesses.

In certain embodiments, the method includes changing the distance between the inner skin and the outer skin by providing a third spacer and a fourth spacer that are different in size than the first spacer and the second spacer.

In other embodiments, the method includes thermally insulating the outer skin from the inner skin by locating the first spacer and the second spacer between the outer skin and the inner skin.

In yet another embodiment, the method includes electrically insulating the outer skin from the inner skin by locating the first spacer and the second spacer between the outer skin and the inner skin.

In still another embodiment, the method includes securing the first spacer and the second spacer to the inner skin using an adhesive.

In some embodiments, the adhesive is a pressure sensitive adhesive.

In a third aspect, there is described an insulated, sectional door that includes a first panel including a first spacer and a second panel including a second spacer. The second panel is hingedly coupled to the first panel to permit movement of the first panel and the second panel with respect to each other from an aligned position to an angled position. The first spacer includes a spacer tongue and the second spacer includes a spacer groove that corresponds in shape to the spacer tongue so that when the first and second panels are in the aligned position the spacer tongue fits within the spacer groove to seal the first panel to the second panel.

In certain embodiments, the first and second spacers maintain a distance between the first and second panels when the first and second panels are in the aligned position.

In other embodiments, the first spacer and the second spacer thermally insulate the first panel from the second panel when the first and second panels are in the aligned position.

In yet another embodiment, the first spacer and the second spacer electrically insulate the first panel from the second panel when the first and second panels are in the aligned position.

In still another embodiment, the first panel includes a tongue and the second panel includes a groove and the tongue is aligned with the groove when the first and second panels are in the aligned position.

In some embodiments, the tongue is spaced from the groove when the first panel and the second panel are in the aligned position.

Other aspects, features, and advantages will become apparent from the following detailed description when taken in conjunction with the accompanying drawings, which are a part of this disclosure and which illustrate, by way of example, principles of the inventions disclosed.

BRIEF DESCRIPTION OF THE DRAWINGS

FIG. 2 is a cross section view of an upper panel that is hingedly coupled to a lower panel;

DETAILED DESCRIPTION

Figure 1:
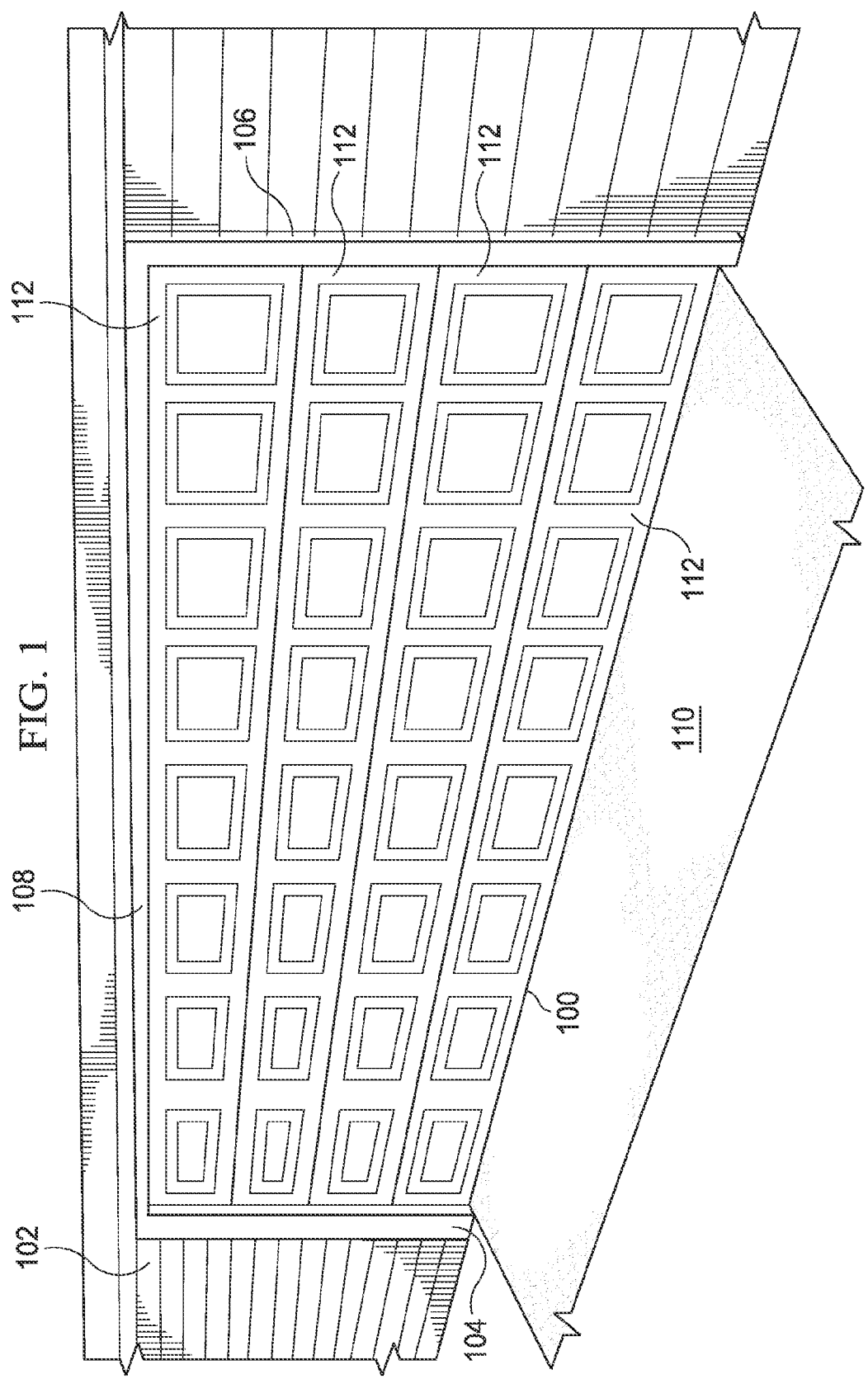
FIG. 1 is a perspective view of a garage door having four door panels.

In the description which follows, like parts are marked throughout the specification and drawings with the same reference numerals, respectively. The drawings are not necessarily to scale and certain features may be shown exaggerated in scale or in somewhat schematic form in the interest of clarity and conciseness.

Referring initially to FIG. 1, an overhead sectional door 100 encloses an opening in a building 102 defined by two jambs 104 and 106 and a header 108. A driveway 110 forms a lower edge of the opening. The door 100 includes four panels 112 that are hingedly connected to each other and mounted on conventional track and rollers (not shown) within the building 102 to enable the movement of the door 100 between the vertical position shown and a horizontal (i.e., overhead) position. In other embodiments, the door 100 may include any number of panels 112 and may be located in any suitable opening.

Referring now to FIG. 2, a lower door panel 114, which is the lowest door panel of the door 100, and an upper door panel 116 are shown. The lower door panel 114 is hingedly coupled to the upper door panel 116 at a hinge 118 to allow the lower door panel 114 and the upper door panel 116 to pivot with respect to each other from the aligned position (shown in FIG. 2) to an angled position (not shown) as the door moves from the closed position (shown in FIG. 1) to an open/horizontal position (not shown). The lower door panel 114 and the upper door panel 116 each include an outer skin 120, an inner skin 122, a foam core 124 disposed between the outer skin 120 and the inner skin 122, a first spacer 126 and a second spacer 128. Additional panels may be connected to the upper door panel 116, as shown in FIG. 1.

Figure 3:
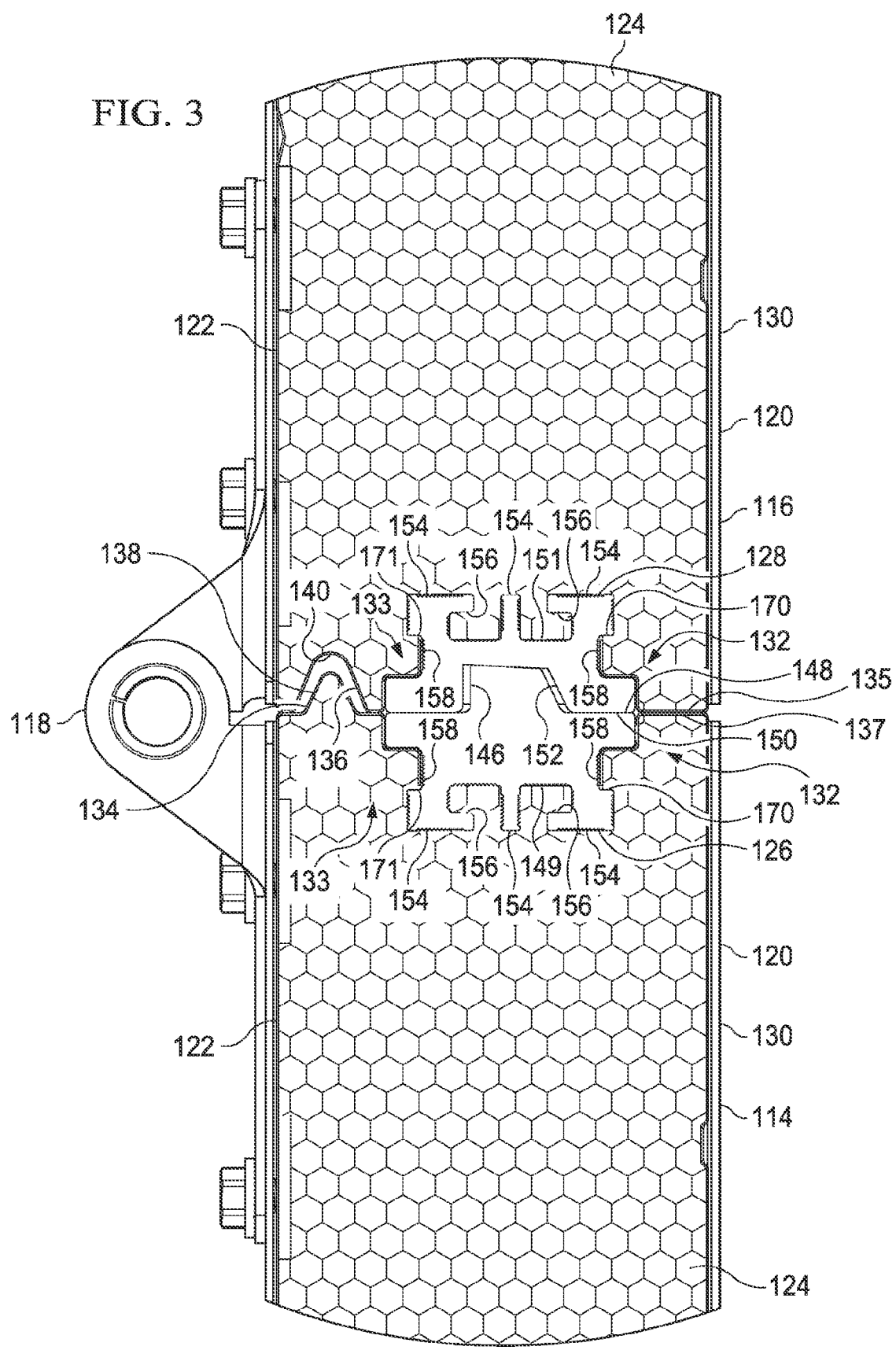
FIG. 3 is a close-up cross section view of the panels of FIG. 2.

Referring again to FIG. 2, the outer and inner skins 120 and 122 form the external surfaces of the lower and upper door panels 114 and 116 and contain a foam core 124 therebetween. The outer and inner skins 120 and 122 may include a substantially planar face or may include ornamentation, such as one or more raised-panel features. Referring now to FIG. 3, the skins 120 and 122 may also include bent portions 132 and 133 near the top 135 and 134 and bottom 137 and 136 of the outer and inner skins 120 and 122, respectively, to allow for attachment of the first and second spacers 126 and 128 to the outer and inner skins 120 and 122, as will be described in more detail below. In some embodiments, the skins 120 and 122 do not include bent portions 132 and 133.

Referring again to FIG. 2, each panel 114 and 116 includes a first spacer 126 and a second spacer 128 disposed between the outer skin 120 and the inner skin 122 to thermally and electrically insulate the outer skin 120 from the inner skin 122. The spacers 126 and 128 also separate the outer skin 120 from the inner skin 122 to give the desired overall thickness to the lower and upper panels 114 and 116. For example, in some embodiments, the spacers 126 and 128 are sized to maintain a distance of about three inches between an exterior surface 130 of the outer skin 120 and an exterior surface 131 of the inner skin 122 to create a panel 114 or 116 that is approximately three inches thick. In other embodiments, the spacers 126 and 128 may be sized to create a panel 114 or 116 that is thicker or thinner than three inches.

The first and second spacers 126 and 128 also thermally and electrically insulate the lower door panel 114 from the upper door panel 116 when the lower door panel 114 and the upper door panel 116 are in the aligned position, as shown in FIG. 2. The first and second spacers 126 and 128 contact each other and maintain a distance between the lower door panel 114 and the upper door panel 116 to further insulate the lower door panel 114 from the upper door panel 116 while sealing the space between the lower door panel 114 and the upper door panel 116. The first and second spacers 126 and 128 seal the space between the lower door panel 114 and the upper door panel 116 to prevent entry of water, air and/or light between the lower door panel 114 and the upper door panel 116 when the lower door panel 114 and the upper door panel 116 are in the aligned position. The first and second spacers 126 and 128 also seal to each other to prevent entry of water, air and/or light between the first and second spacers 126 and 128 when the lower door panel 114 and the upper door panel 116 are in the aligned position. Thus, in some embodiments, the distance between the lower door panel 114 and the upper door panel 116 is filled by and sealed by the first and second spacers 126 and 128 when the door panels 114 and 116 are in the aligned position.

Referring now to FIG. 3, the inner skin 122 includes a tongue 138 positioned on the top 134 of the inner skin 122 and a groove 140 positioned on the bottom 136 of the inner skin 122. The tongue 138 corresponds in shape to the groove 140 so that the tongue 138 fits within the groove 140 when the lower and upper door panels 114 and 116 are in the aligned position. The tongue 138 and groove 140 help to prevent the passage of water and contaminants between the lower door panel 114 and the upper door panel 116. In some embodiments, the surface of the tongue 138 does not contact the surface of the groove 140 when the lower door panel 114 and the upper door panel 116 are in the aligned position to prevent the transfer of thermal and/or electrical energy between the lower and upper door panels 114 and 116 by way of the tongue 138 and groove 140, as shown in FIG. 3. While the tongue 138 and groove 140 are located between the spacers 126 and 128 and the hinge 118 in FIGS. 2 and 3, the tongue 138 and groove 140 may be located at any suitable location, for example, between the spacers 126 and 128 and the exterior surface 130 of the outer skin 120.

In some embodiments, the inner skin 122 includes a first rabbet (not shown) positioned on the top 134 of the inner skin 122 and a second rabbet (not shown) positioned on the bottom 136 of the inner skin. The first rabbet corresponds in shape to the second rabbet so that the first and second rabbets form a shiplap joint when the lower and upper door panels 114 and 116 are in the aligned position. In other embodiments, the lower and upper door panels 114 and 116 may form any suitable joint when in the aligned position, such as, for example, a butt joint or an anti-pinch joint.

Figure 4:
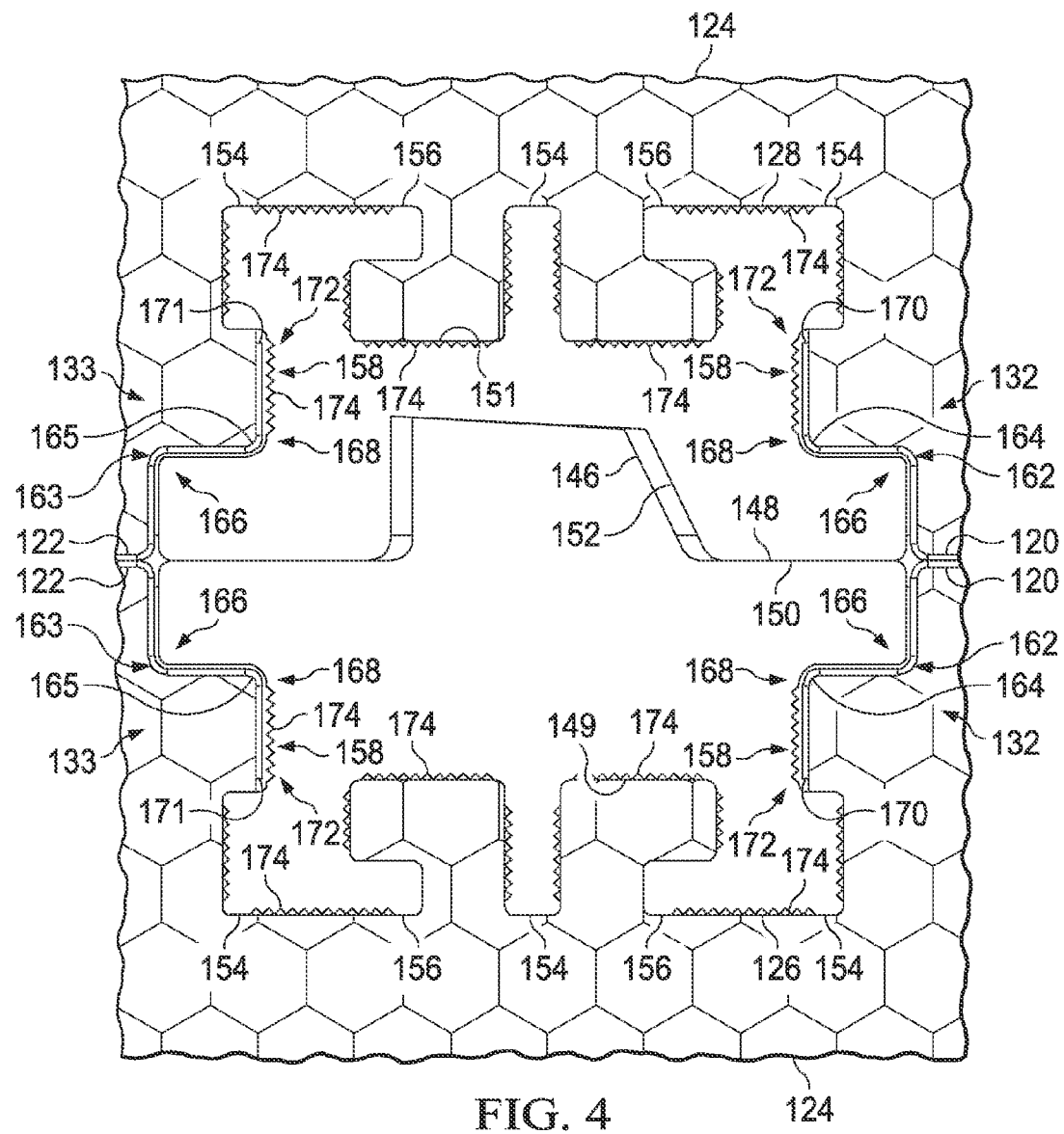
FIG. 4 is a further magnified, close-up cross sectional view of the panels of FIG. 2.

Referring now to FIG. 4, the first spacer 126 includes a spacer tongue 146 on an outer surface 148 of the first spacer 126 and the second spacer 128 includes a spacer groove 152 on an outer surface 150 of the second spacer 128 that corresponds in shape to the spacer tongue 146. Similar to the tongue 138 and groove 140 shown in FIG. 3, the spacer tongue 146 and spacer groove 152 help prevent passage of water and contaminants between the lower panel 114 and the upper panel 116. However, unlike the tongue 138 and groove 140 shown in FIG. 3, in some embodiments the spacer tongue 146 contacts the spacer groove 152 and may compress against the spacer groove 152 to seal the lower door panel 114 to the upper door panel 116 to prevent passage of water, light and air between the first spacer 126 and the second spacer 128. In the embodiment of FIG. 4, the spacer tongue 146 is in the shape of a truncated triangle and the spacer groove 152 is in a corresponding shape. In other embodiments, the spacer tongue 146 and the spacer groove 152 may be any suitable shape, such as, for example, a rounded triangular shape similar to the tongue 138 and groove 140 shown in FIG. 3. In some embodiments, the first and second spacers 126 and 128 include a different joint, such as, for example, a shiplap joint, a butt joint, an anti-pinch joint, or another suitable joint.

The first spacer 126 and the second spacer 128 also include protrusions 154 on inner surfaces 149 and 151 of the spacers 126 and 128, respectively. In some embodiments, the protrusions 154 help to secure the spacers 126 and 128 to the foam core 124 and thereby secure the spacers 126 and 128 to the door panel 114 or 116. The spacers 126 and 128 may include any number of protrusions 154 and the protrusions 154 may be any suitable shape and size. In the embodiment shown in FIG. 4, for example, some of the protrusions 154 include a ledge 156 that extends perpendicularly from the protrusion 154. A volume of the foam core 124 is located between the ledge 156 and the inner surface 149 or 151 of the spacer 126 or 128 to further secure the spacer 126 or 128 to the foam core 124. In other embodiments, the protrusions 154 may be curved in shape and may include one or more prongs, hooks or other features to further secure the spacers 126 and 128 to the foam core 124. In some embodiments, the protrusions 154, as well as the inner surfaces 149 and 151, may include texturization 174 such as, for example, small ridges and grooves, to increase the surface area of the spacers 126 and 128 that comes into contact with the foam core 124.

In some embodiments, the spacers 126 and 128 also include lateral steps 158 that extend inwardly from lateral sides of the spacers 126 and 128. The lateral steps 158 correspond in shape to bent portions 132 and 133 of the outer and inner skins 120 and 122, respectively, so that a friction fit exists between the lateral steps 158 and the bent portions 132 and 133 to help secure the spacers 126 and 128 in the correct position with respect to the outer and inner skins 120 and 122 and to improve the structural integrity of the lower and upper door panels 114 and 116. As such, a first corner 162 and 163 and second corner 164 and 165 of the bent portions 132 and 133 correspond to the first and second corners 166 and 168, respectively, of the lateral steps 158. In addition, ends 170 and 171 of the skins 120 and 122 contact a third corner 172 of the lateral steps 158 to further hold the spacers 126 and 128 in place with respect to the skins 120 and 122. In other embodiments, the lateral steps 158 and the bent portions 132 and 133 may have any suitable shape and need not be in the specific configurations shown in FIG. 4.

The first and second spacers 126 and 128 may be constructed of any suitable material and are preferably constructed of a material that can be compressed, is resilient and flexible, and is a thermal and/or electrical insulator. In some embodiments, for example, the spacers 126 and 128 are made of polyvinyl chloride (PVC) and/or ethylene propylene diene monomer (EPDM).

Figure 5:
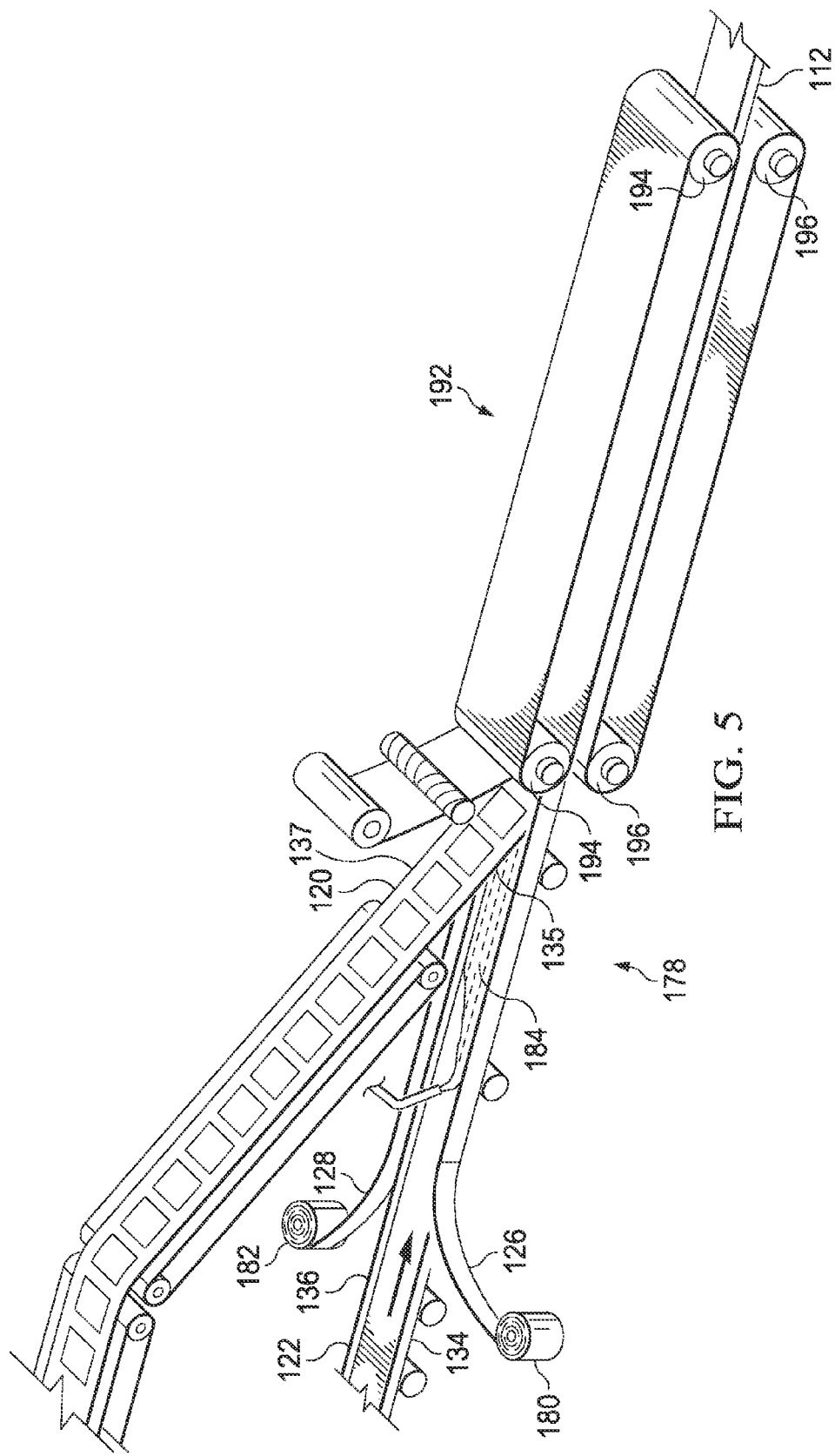
FIG. 5 is a schematic perspective view of a continuous, automated method of manufacturing insulated door panels.

Referring now to FIG. 5, a continuous, automated method of manufacturing insulated door panels 112 is shown schematically. A outer skin 120 is supplied in a continuous fashion from a roller (not shown) or some other continuous feed, such as, for example, a series of panels that are linked together at a flexible joints, as described in U.S. Pat. No. 4,746,383 entitled "Continuous Foamed-in-place Door Panel Manufacturing Process," which is hereby expressly incorporated by reference. An inner skin 122 is also supplied in a continuous fashion from a roller (not shown) or some other continuous feed. The outer skin 120 and/or the inner skin 122 may pass through one or more forming stations, such as, for example, an embossing station, a stamping station, or a roll form station. The outer skin 120 is aligned over the inner skin 122, and the outer and inner skins 120 and 122 are fed toward a foaming station 178.

A first spacer 126 and a second spacer 128 are also supplied in a continuous fashion from rollers 180 and 182, respectively, toward the foaming station 178. As described above, the spacers 126 and 128 are made of a flexible, resilient material, such as PVC, that may be rolled, stored, and then continuously feed from the rollers 180 and 182. The first and second spacers 126 and 128 are unrolled from rollers 180 and 182, respectively, and the first spacer 126 is placed adjacent to the top 134 of the inner skin 122 and the second spacer 128 is placed adjacent to a bottom end 136 of the inner skin 122 such that the inner surfaces 149 and 151 (FIG. 4) of the first and second spacers 126 and 128, which include the protrusions 154, face a center of the inner skin 122. In some embodiments, the first and second spacers 126 and 128 are secured to the inner skin 122 by an adhesive (not shown), such as, for example, a pressure sensitive adhesive. In some embodiments, the spacers 126 and 128 are arranged so that they are perpendicular to the inner skin 122.

The outer skin 120, inner skin 122, first spacer 126 and second spacer 128 are conveyed to the foaming station 178 where a foamable liquid 184 is injected between the inner skin 122, the first spacer 126 and the second spacer 128, as shown schematically in FIG. 5. The outer skin 120 is then aligned with the inner skin 122 and placed so that the top 135 of the outer skin 120 is adjacent to the first spacer 126 and the bottom 137 of the outer skin 120 is adjacent to the second spacer 128. As such, the first spacer 126 and the second spacer 128 maintain a predetermined distance between the outer and inner skins 120 and 122, which may be, for example, between about 1 inch and about 4 inches. Any distance may be maintained by the spacers 126 and 128 between the outer and inner skins 120 and 122. The foamable liquid 184 is then allowed to cure to form the foam core 124 (FIG. 4) as the outer skin 120, inner skin 122, first spacer 126 and second spacer 128 pass through a pressure conveyor 192. The protrusions 154, which protrude into the volume of foamable liquid 184, are secured within the foam core 124 when the foamable liquid 184 solidifies to form the foam core 124. In some embodiments, the ledges 156 and/or surface texture 174 on the protrusions 154 (FIG. 4) further secure the protrusions 154 to the foam core 124 as the foamable liquid 184 cures.

In some embodiments, the pressure conveyor 192 is adjustable such that the pressure conveyor 192 can be adjusted to form panels 112 of different thicknesses using first and second spacers 126 and 128 of different heights. For example, in some embodiments, a distance between the top rollers 194 and the bottom rollers 196 of the pressure conveyor 192 can be adjusted to accommodate first and second spacers 126 and 128 of different heights, thus creating panels 112 of different heights. In one embodiment, for example, the pressure conveyor 192 may be adjusted to produce a thicker panel 112 by increasing the distance between the top rollers 194 and the bottom rollers 196. In one embodiment, the pressure conveyor 192 may be adjusted to produce a thinner panel 112 by decreasing the distance between the top rollers 194 and the bottom rollers 196.

In some embodiments, spacers 126 and 128 of different heights can be used to create panels 112 of different sizes without modifying the outer skin 120 and inner skin 122. Referring to FIG. 2, for example, to increase the thickness of the door 100, taller first spacers 126 and taller second spacers 128 are located between the outer skin 120 and the inner skin 122. To decrease the thickness of the door 100, shorter first spacers 126 and shorter second spacers 128 are located between the outer skin 120 and the inner skin 122. Thus, referring again to FIG. 5, to increase the thickness of the panel 112 that is produced, the spacers 126 and 128 are replaced with larger spacers 126 and 128 and the pressure conveyor 192 is adjusted so that the distance between the top rollers 194 and the bottom rollers 196 of the pressure conveyor 192 is greater. To decrease the thickness of the panel 112 that is produced, the spacers 126 and 128 are replaced with smaller spacers 126 and 128 and the pressure conveyor 192 is adjusted so that the distance between the top rollers 194 and the bottom rollers 196 is smaller. Changing the spacers 126 and 128 and adjusting the pressure conveyor 192 can be done quickly and thus manufacturing downtime to allow for changes in panel 112 thickness may be minimized. In addition, since the thickness of the panel 112 can be adjusted without changing the design and/or the manufacturing process of the outer skin 120 and the inner skin 122, in some embodiments, tooling associated with the outer skin 120 and the inner skin 122 need not be adjusted and/or replaced in order to change the thickness of the panel 112 that is produced. This may also decrease the cost and time associated with changing the thickness of the panel 112.

In some embodiments, the method of manufacturing door panels also includes securing a first bulb seal 186 (FIG. 2) to a bottom end 188 of the lower door panel 114. The first bulb seal 186 is located on the bottom end 188 of the lowest panel of an insulated door 100 to provide a sealing surface between the door 100 and the driveway 110, as shown in FIG. 1. Referring again to FIG. 2, in some embodiments the method may also include securing a second bulb seal 190 within the first bulb seal 186 so that if the first bulb seal 186 is damaged or otherwise removed, the second bulb seal 190 will continue to seal to the driveway 110. The first and second bulbs seals 186 and 190 may be made of any suitable material and in some embodiments are made of a durable, thermally-insulating material such as PVC or EPDM.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "outer" and "inner," "upper" and "lower," "first" and "second," "internal" and "external," "above" and "below" and the like are used as words of convenience to provide reference points and are not to be construed as limiting terms.

In addition, the foregoing describes only some embodiments of the invention(s), and alterations, modifications, additions and/or changes can be made thereto without departing from the scope and spirit of the disclosed embodiments, the embodiments being illustrative and not restrictive.

Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. An insulated, sectional door, comprising:
a first panel including a first spacer disposed between an outer skin and an inner skin, wherein the first spacer includes a first protrusion on an inner surface of the first spacer;
a second panel pivotally coupled to the first panel and including a second spacer disposed between an outer skin and an inner skin, wherein the second spacer includes a second protrusion on an inner surface of the second spacer;
wherein the first protrusion extends into and secures the first spacer to a first foam core sandwiched between the outer and inner skins of the first panel and the second protrusion extends into and secures the second spacer to a second foam core sandwiched between the outer and inner skins of the second panel; and
wherein the first spacer and the second spacer include lateral steps that correspond in shape to and engage with bent portions extending from the outer and inner skins of the first and second panels to secure the first and second spacers to the first and second panels; and
wherein at least a portion of the foam core is disposed between the lateral steps and the outer and inner skins of the first and second panels to separate the first and second spacers from outer and inner skins of the first and second panels.

2. The insulated, sectional door of claim 1, wherein the first and second protrusions include a ledge to further secure the first and second protrusions to the first and second foam cores, respectively.

3. The insulated, sectional door of claim 1, wherein a surface of the first and second protrusions includes a texture to increase the surface area of the first and second protrusions that contacts the first and second foam cores, respectively.

4. The insulated, sectional door of claim 1, wherein the first and second spacers each include three protrusions.

5. The insulated, sectional door of claim 1, wherein an outer surface of the first spacer includes a tongue and an outer surface of the second spacer includes a groove that corresponds to the tongue.

6. The insulated, sectional door of claim 5, wherein the inner skin of the first panel further comprises a second groove and the inner skin of the second panel further comprises a second tongue; the second groove and the second tongue forming a second barrier, along with the groove and tongue in the first and second spacers, to prevent contaminants moving through the first and the second panels when the insulated, sectional door is in a closed position.

7. The insulated, sectional door of claim 1, wherein the lateral steps of the first spacer and the second spacer frictionally engage with the bent portions of outer and inner skins of the first and second panels.

8. The insulated, sectional door of claim 1, wherein the first and second spacers are sized to maintain a distance of about three inches between the outer skin and the inner skin of the first and second panels.

9. The insulated, sectional door of claim 1, wherein the bent portions comprising at least four right angles to provide at least three contact surface areas between each of the outer and inner skins of the first and second panels and the respective first or second spacer.

10. The insulated, sectional door of claim 1, wherein the inner skin of the first panel further comprises a groove and the inner skin of the second panel further comprises a tongue; the groove and the tongue forming a barrier against contaminants moving from and into the first and the second spacers.

11. The insulated, sectional door of claim 1, wherein the second panel is pivotally coupled to the first panel via a hinge fastened onto the inner skins of first and second panels.

12. An insulated, sectional door, comprising:
   a first panel including a first spacer that extends into a first foam core sandwiched between a first set of inner and outer skins;
   a second panel including a second spacer that extends into a second foam core sandwiched between a second set of inner and outer skins, wherein the second panel is pivotally coupled to the first panel to permit movement of the first panel and the second panel with respect to each other from an aligned position to an angled position;
   wherein the first spacer includes a spacer tongue and the second spacer includes a spacer groove that corresponds in shape to the spacer tongue so that when the first and second panels are in the aligned position the spacer tongue fits within the spacer groove to seal the first panel to the second panel;
   wherein the first spacer and the second spacer include lateral steps to engage with correspondingly shaped bent portions extending from respective first and second sets of outer and inner skins; and
   wherein at least a portion of the foam core is disposed between the lateral steps and first and second sets of the outer and inner skins to separate the first and second spacers from first and second sets of outer and inner skins.

13. The insulated, sectional door of claim 12, wherein the first and second spacers maintain a distance between the first and second panels when the first and second panels are in the aligned position.

14. The insulated, sectional door of claim 12, wherein the first spacer and the second spacer thermally insulate the first panel from the second panel when the first and second panels are in the aligned position.

15. The insulated, sectional door of claim 12, wherein the first spacer and the second spacer electrically insulate the first panel from the second panel when the first and second panels are in the aligned position.

16. The insulated, sectional door of claim 12, wherein the first panel includes a tongue and the second panel includes a groove, wherein the tongue is aligned with the groove when the first and second panels are in the aligned position.

17. The insulated, sectional door of claim 16, wherein the tongue is spaced from the groove when the first panel and the second panel are in the aligned position.

18. The insulated, sectional door of claim 12, wherein the bent portions comprising at least four right angles to provide at least three contact surface areas between each of the first and second sets of outer and inner skins and the respective first or second spacer.

\* \* \* \* \*